Nov. 23, 1965    C. B. JONES    3,218,900
FLYING SHEAR FOR ROD MATERIAL
Original Filed June 23, 1960    2 Sheets-Sheet 1
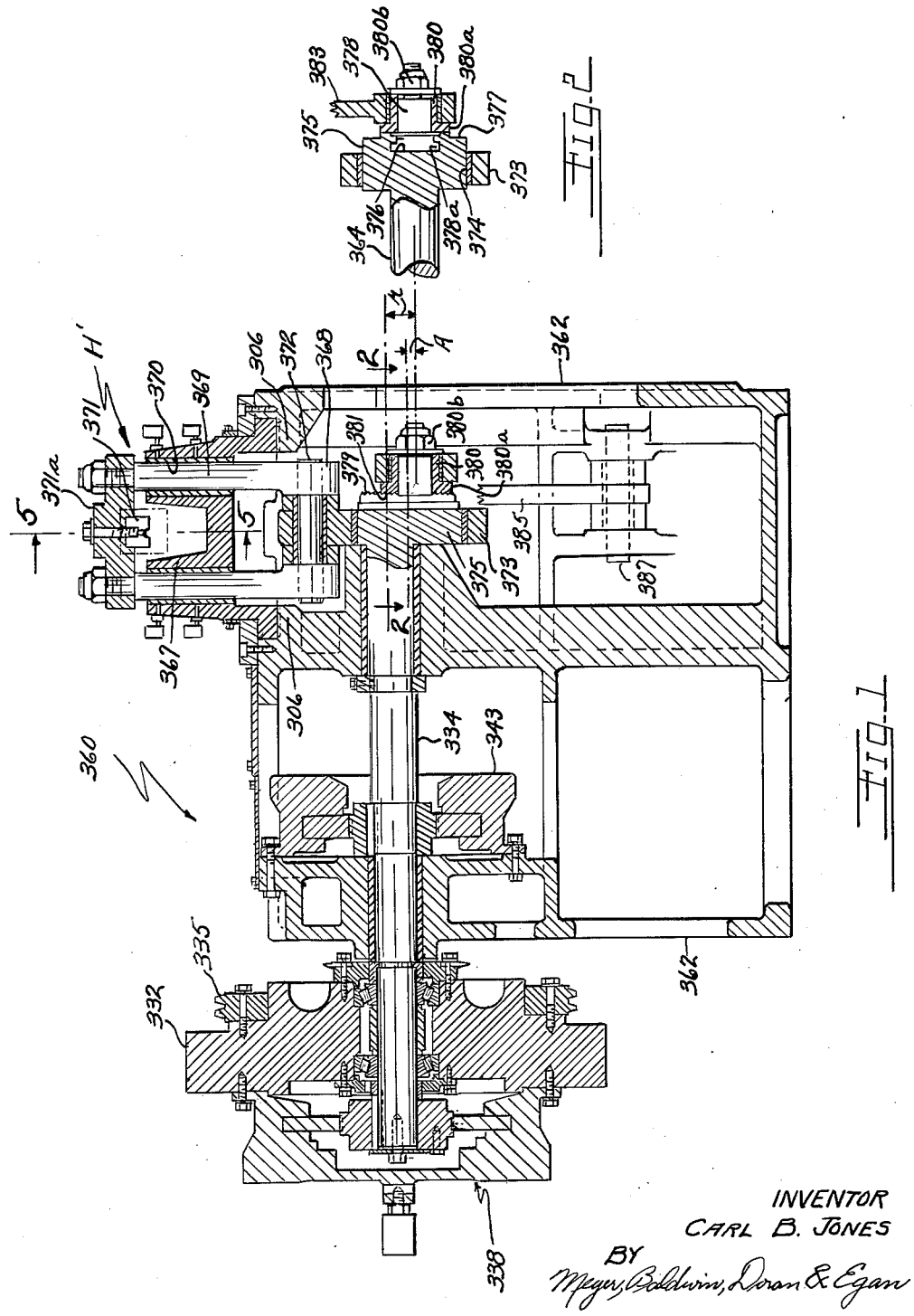
INVENTOR
CARL B. JONES
BY
Meyer, Baldwin, Doran & Egan
ATTORNEYS

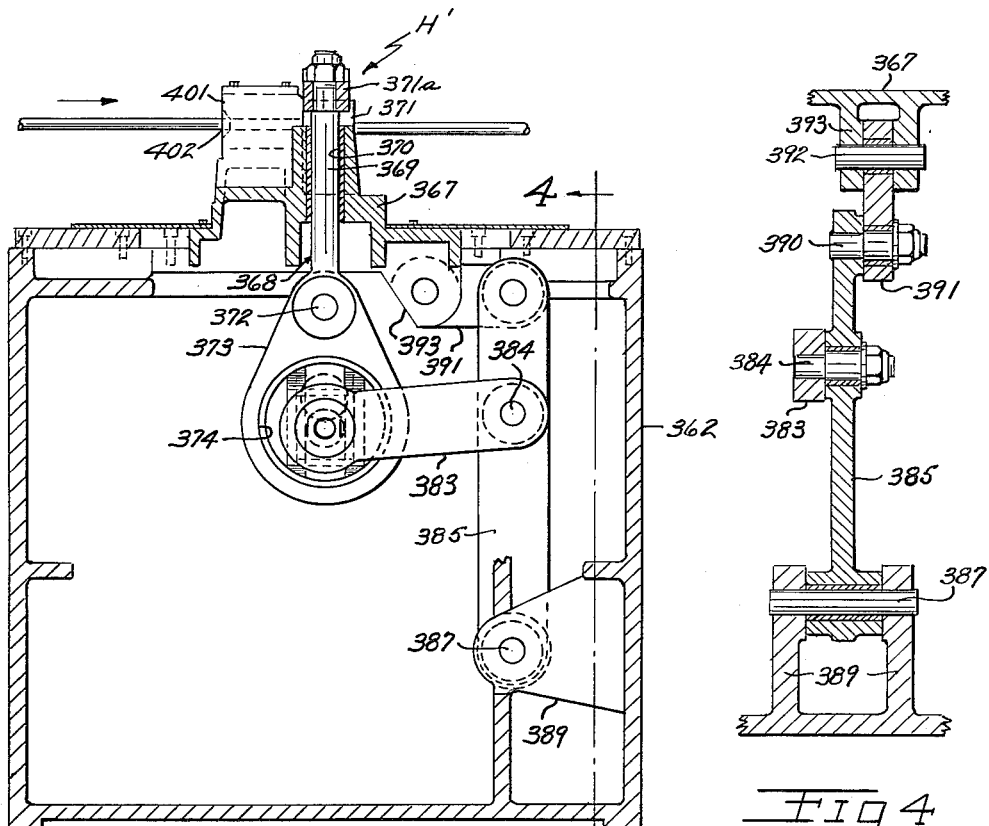
Fig. 3
Fig. 4
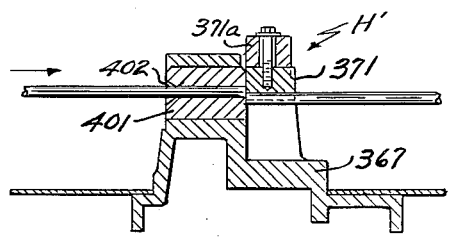
Fig. 5
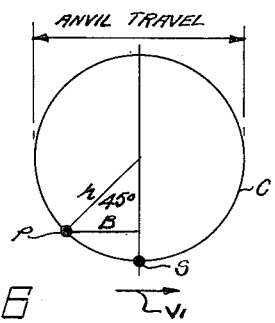
Fig. 6
INVENTOR
CARL B. JONES
BY
Meyer, Baldwin, Doran & Egan
ATTORNEYS

United States Patent Office

3,218,900
Patented Nov. 23, 1965

3,218,900
FLYING SHEAR FOR ROD MATERIAL
Carl B. Jones, Hudson, Ohio, assignor to Cleveland Wire Machinery Co., Hudson, Ohio, a corporation of Ohio
Original application June 23, 1960, Ser. No. 38,331. Divided and this application June 25, 1963, Ser. No. 292,516
3 Claims. (Cl. 83—299)

This application is a division of my copending application Serial No. 38,331, filed June 23, 1960, now abandoned.

This invention relates to a new and novel flying shear for cutting measured lengths from a continuous strip of a bar or rod.

An object of the present invention is to provide a flying shear structure for accurately cutting predetermined lengths of rod-like elements wherein rod-like material is presented in a continuous straight length to the shear. The invention has particular application in a straighten and cut machine wherein the rod-like material is straightened as it enters the machine and then is fed to the flying shear to be cut into predetermined lengths.

Other objects and advantages of this invention will be apparent to those skilled in the art upon reference to the following disclosure and the accompanying drawings included as a part of the specification, and wherein:

FIG. 1 is a transverse section view of a cut-off mechanism for use in a rod material fabricating machine, and which is especially designed for continuously cutting straightened rod into short rod lengths;

FIG. 2 is a fragmentary sectional view taken approximately on the plane as is indicated by the line 2—2 in FIG. 1;

FIG. 3 is a longitudinal sectional view of the cut-off mechanism of FIG. 1;

FIG. 4 is a fragmentary view of the shearing head in the modified cut-off mechanism of FIG. 3 and showing the drive linkage for the same;

FIG. 5 is a fragmentary sectional view taken approximately on the line 5—5 in FIG. 1; and FIG. 6 is a pictorial illustration of the circular orbit or working stroke inscribed by the shoe of the cut-off mechanism about its drive shaft.

In FIGS. 1 to 5 inclusive, is shown a cut-off means identified in its entirety by the reference numeral 360, and which is especially designed to be automatically operable so as to continuously cut the straightened rod material into preselected lengths of exact dimensions, the characteristics of the instant structure being particularly applicable to provide exact rod lengths within the limits of 6 to 18 inches. However, as will be hereinafter apparent the cut-off means may also be arranged so as to provide for longer or shorter rod lengths.

With reference now directed particularly to FIG. 1 the cut-off means includes a box-like housing 362 and which movably supports a cutting or shearing head H' on its slideways 306.

The housing 362 is seen to rotatably support a drive shaft 364, the latter on its exterior end mounting flywheel and clutch components 332, 338, respectively. Brake unit 343 is carried on the shaft 364 within the housing 362.

The shearing or cutting head H' includes an anvil 367 slidably supported on the housing slideways 306 and which carries tie rods 369 having enlarged ends 368, the rods being slidably disposed within a vertical bore 370 and mounting a shearing block support bar 371a between the upper ends thereof. Support bar 371a is seen to mount shearing block 371.

Connecting pin 372 journally connects tie rods 369 to a tear-shaped yoke 373, the latter at its opposite end, having a bore 374 formed thereon and into which is journalled an eccentric 375 formed on the inner end of the aforesaid shaft 364.

As best seen in FIG. 2, the eccentric 375 is provided with a T-shaped slot 376 extending diametrically across its front face 377 and into which the heel 378a of a shoe 378 is slidably disposed.

A series of teeth or serrations 379 are formed on the aforesaid face of eccentric 375 on either side of the slot 376 and extending longitudinally therealong.

A bushing 380, having a flange 380a formed on its one end, is adapted to be disposed over the neck portion of the shoe 378, said flange, in addition, having a pair of spaced rows of teeth or serrations 381 formed thereon and which are disposed and so as to mesh with the aforesaid teeth 379 on the eccentric 375.

The shoe 378 as thus mounted, is intended to be selectively movable within the aforesaid slot 376 and thereby carry the bushing 380 into an adjusted position whereby its axis is in preselected spaced relation to the axis of the eccentric 375, for example as is indicated by the reference character A in FIG. 1, the purpose for which will be hereinafter described in greater detail. A suitable lock nut 380b receivable on the threaded end of the neck portion of the shoe 378 is adapted to lock the latter and said bushing in the adjusted position.

One end of a link 383, FIG. 3, is journalled on the bushing 380, and its opposite end is pivotally mounted on a pin 384, the latter being carried within a lever arm 385 intermediate its ends.

One end of lever arm 385 is pivotally suspended by pin 387 between a spaced pair of brackets 389 extending from and integral with the adjacent housing wall, and its opposite end is similarly pivotally connected by pin 390 to one end of link arm 391. The opposite end of link arm 391 is likewise seen to be pivotally suspended by pin 392 between a pair of spaced depending ears 393 formed integral with the aforesaid anvil 367.

The anvil 367 also mounts a mandrel 401 in the same manner as in the previous embodiment, and which is likewise provided with a bore 402 disposed in the path of rod material feed and through which straightened rod material is passed, the aforesaid shearing block 371 being thus reciprocated at one end of said mandrel to shear a predetermined length of rod material from the same.

As is previously mentioned, the cut-off means is intended to be continuously cyclically operable to cut the straightened rod material into preselected exact rod lengths.

To accomplish this, the clutch unit 338 is preferably continuously energizable so as to connect the fly-wheel 332 to the shaft 364 and thus effect a continuous counter-clockwise rotation of the same as viewed in FIGS. 1 and 3.

With the shaft 364 thus actuated, the eccentric 375 integral therewith will thereby cyclically reciprocate the yoke 373 and connected tie rods 369 being thus effective to carry the shearing block 371 vertically past the mandrel bore 402 and shear the rod material projecting therethrough, said shearing block 371, as viewed in FIG. 5, being in its shearing stroke at the instant just after the length of rod material has been completely sheared.

During the shearing stroke of the shearing block 371, the anvil 367, through its connecting link 383, arm 385 and link 391, is also being reciprocated horizontally along its supporting slideways so that at the instant said material is sheared said anvil is intended to be moving in the same direction and at the same velocity as said material.

To obtain a predetermined sheared length of rod material of exact dimension, for example, a rod length of exactly 12 inches, it will be recalled that the eccentric 375 and shoe 378 carried thereon make one complete circular orbit per each shearing cycle of the shearing block 371.

Assume now that the rod material is presented to the cut-off means at a selected rate of approximately 60 feet per minute or 12 inches per second, and that the shaft is being rotatably driven at a speed of 60 r.p.m., it will be realized that during each one minute interval the cut-off means is required to be operated 60 times to thus provide 60 rod lengths, each having a length of 12 inches.

It will be further realized that if the anvil was connected directly to said shoe, the linear distance said anvil would be reciprocally moved in either direction is approximately equal to $2r$, while during the same interval the aforesaid shoe axis moves through an arcuate distance about the axis of the shaft that is equal to $\pi r$, for 180 degrees of rotation, and that for one complete cycle of rotation of the eccentric $2\pi r$, the anvil is moved a linear distance of $4r$. However, with the link arm 383 being connected intermediate the ends of the arm 385, preferably ⅔ along the length of the latter from its pivotal connection 387, the mechanical advantage of the linkage connection between the shoe and anvil is such that the anvil is moved a total linear distance of $4r \times \frac{3}{2}$ or $6r$ during each revolution of the shaft 364.

It will be also apparent that if the anvil was connected directly to said shoe the linear speed in feet per minute of the anvil along its slideways would be the same as that for the shoe at the instant the axis of the shoe is vertically below the axis of the shaft. At this instant as seen in FIG. 6, the axis of the shoe, as indicated at S has a velocity identified as $V_1$. And, if in this instance the axis of the shoe is adjusted so as to be at a distance from the axis of the shaft to cause it to inscribe a circle having a circumference of 12 inches, obviously the linear speed of the anvil at this instant will be 12 inches/second and will exactly correspond to the speed of the rod material.

However, it is preferred to shear the rod material at a shear point P as indicated on the working cycle C of the shoe axis that is approximately 45° ahead of this latter position and consequently to have the anvil speed correspond to the rod material feed at this shear point P, the shoe and anvil speed should be increased accordingly.

With this particular structural assembly therefore, to shear rod lengths of exactly 12 inches, and to have the anvil speed correspond to the rod material feed at the point of shear P of FIG. 6, the distance "$r$" that is to be established between the axis of the shaft 364 and the axis of the shoe 378 may be determined by the following equation.

$$r = \frac{C}{\text{cosine shearing angle}} \left(\frac{1}{2\pi}\right)\left(\frac{1}{MA}\right)$$

where:

C is the circumference of the circule inscribed by the shoe 378 and which is equal in inches to the length of rod material to be cut; (in this instance 12 inches)
shearing angle $\alpha = 45°$
cosine $= .707$ $MA =$ mechanical advantage of link arm (in this instance ⅔)

or:

$$r = \frac{12}{.707} \frac{1}{2\pi} \frac{1}{(3/2)}$$
$$= 1.801 \text{ inches}$$

As previously mentioned, the instant cut-off assembly is designed to cut exact rod lengths within the approximate limits of 6 to 18 inches.

Consequently, a rod length of 12 inches is at the midpoint of said range.

It will now be realized that to shear rod lengths of 6 inches, the shoe 378 is adjusted within the eccentric slot 376 so that its axis is $$\frac{6}{.707}\left(\frac{1}{2\pi}\right)\left(\frac{2}{3}\right)$$

or approximately .901 inch from and below the shaft axis as seen in FIG. 1.

In like manner, it will also be apparent that to shear rod lengths of 18 inches, the shoe 378 is similarly adjusted so that its axis is $$\frac{18}{.707}\left(\frac{1}{2\pi}\right)\left(\frac{2}{3}\right)$$

or approximately 2.703 inches from and below said shaft axis.

It is thus apparent from the above description that in order to cut various lengths of rod material by this continuous cycling method and to have the anvil and rod material speed synchronized during the cutting or shearing operation, it is necessary to adjust the travel or stroke of the anvil for various lengths. Furthermore, if the speed of the anvil and rod material are not synchronized during the shearing operation objectional results may be obtained such as a sudden interruption of the normal feed of the rod material as it passes through previously described feed and straightening machine components thus causing a shock load to be placed on said feed means, and likewise slippage of the rod material in said feed means which can cause objectional marking of the rod material. Also a longitudinal pressure or tension may be applied to the rod due to an interruption of the feed of the material during a cutting cycle which may cause an increase or decrease in the diameter of the rod material as it passes through the rotary straightener device to thus result in a non-uniform diameter of cut rod lengths.

What is claimed is:

1. A flying shear for cutting exact lengths of rod material comprising a housing, an anvil including a mandrel slidably supported on said housing so as to be reciprocally movable along a rod conveyance path, a shearing block movable to and fro of said mandrel effective to cut rod material passing therebetween, means for actuating said shearing block and mandrel comprising a shaft rotatable in said housing, an eccentric carried on said shaft, means connected with said shearing block and said eccentric effective to cyclically move said block to and fro of said mandrel in response to the rotation of said shaft, link means, a shoe connecting one end of said link means to said eccentric, said link means connecting at the opposite end to said anvil, said link means being effective to cause the reciprocal movement of said anvil along said conveyance path in response to the rotation of said shaft, said shoe being attached to said eccentric as to be spaced from the axis of said shaft a distance that is determined by the equation $$r = \frac{C}{\text{cosine of shearing angle}}\left(\frac{1}{2\pi}\right)\left(\frac{1}{MA}\right)$$

where C is the circumference of the circle inscribed by the shoe and which is equal in inches to the length of rod material to be cut; the shearing angle is the angle inscribed between a first line extending between the axis of the shaft and passing through the axis of the shoe when the same are in vertical alignment and a second line extending between the axes of the shaft and shoe at the instant the rod material is to be sheared by the mandrel; and MA is the mechanical advantage of the link means between said eccentric and anvil.

2. In a flying shear as is defined in claim 1 and wherein the shoe is adjustably mounted on the eccentric.

3. In a flying shear as is defined in claim 2 and wherein the adjustable mounting for the shoe comprises means defining a slot in the eccentric extending through the axis thereof, and means on said shoe which is slidably accommodated in said slot.

References Cited by the Examiner

UNITED STATES PATENTS

| 1,624,367 | 4/1927 | Scheffey | 83—318 |
| 2,215,762 | 9/1940 | Morrison | 83—311 |
| 2,228,162 | 1/1941 | Benham et al. | 83—311 |
| 2,258,339 | 10/1941 | Sieger | 83—311 |
| 2,278,786 | 4/1942 | Johnston | 83—320 |

FOREIGN PATENTS

| 785,319 | 8/1935 | France. |

WILLIAM W. DYER, JR., *Primary Examnier.*

ANDREW R. JUHASZ, *Examiner.*